United States Patent
Hwang et al.

(10) Patent No.: US 9,602,403 B2
(45) Date of Patent: Mar. 21, 2017

(54) METHOD AND APPARATUS FOR TRANSMITTING AND RECEIVING PACKET IN BROADCASTING SYSTEM

(71) Applicant: Samsung Electronics Co., Ltd., Suwon-si, Gyeonggi-do (KR)

(72) Inventors: Sung-Hee Hwang, Suwon-si (KR); Kyung-Mo Park, Seoul (KR); Hyun-Koo Yang, Seoul (KR); Seho Myung, Seoul (KR); Sung-Oh Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/375,317

(22) PCT Filed: Jan. 31, 2013

(86) PCT No.: PCT/KR2013/000811
§ 371 (c)(1),
(2) Date: Jul. 29, 2014

(87) PCT Pub. No.: WO2013/115586
PCT Pub. Date: Aug. 8, 2013

(65) Prior Publication Data
US 2014/0376552 A1 Dec. 25, 2014

(30) Foreign Application Priority Data
Feb. 1, 2012 (KR) .................. 10-2012-0010469

(51) Int. Cl.
*H04L 12/28* (2006.01)
*H04L 12/56* (2006.01)
(Continued)

(52) U.S. Cl.
CPC ............ *H04L 45/74* (2013.01); *H04L 1/0083* (2013.01); *H04L 12/18* (2013.01); *H04L 69/22* (2013.01);
(Continued)

(58) Field of Classification Search
None
See application file for complete search history.

(56) References Cited

U.S. PATENT DOCUMENTS 5,802,051 A 9/1998 Petersen et al.
2007/0058565 A1 3/2007 Wiatrowski et al.
(Continued)

FOREIGN PATENT DOCUMENTS

KR 10-2008-0045548 A 5/2008

OTHER PUBLICATIONS

Schulzrinne et al.; RTP: A Transport for Real-Time Applications; Network Working Group Request for Comments: 3550; Obsoletes: 1889; Category: Standards Track; The Internet Society; Jul. 2003.

*Primary Examiner* — Edan Orgad
*Assistant Examiner* — Rebecca Song
(74) *Attorney, Agent, or Firm* — Jefferson IP Law, LLP

(57) ABSTRACT

A method and an apparatus for transmitting and receiving packets in a broadcasting system are provided. The present disclosure allocates a padding size field by using padding octets, and thus can increase transmission efficiency. Also, the present disclosure does not restrict the number of padding octets while maintaining compatibility with existing disclosures, and thus can carry out as much padding as desired and as necessary. In addition, the present disclosure variably allocates the padding size field depending on the number P of padding octets, and thus can increase header efficiency. Furthermore, since the number of padded octets in a header is immediately known, the size of an actual
(Continued)

In case that # of Padding Octets P ≥ 256 payload is known in advance, and thus rapid transmission is possible.

12 Claims, 10 Drawing Sheets

(51) Int. Cl.
*H04L 12/741* (2013.01)
*H04L 12/18* (2006.01)
*H04L 29/06* (2006.01)
*H04L 1/00* (2006.01)
*H04L 7/04* (2006.01)

(52) U.S. Cl.
CPC ............ *H04L 1/004* (2013.01); *H04L 1/0007* (2013.01); *H04L 7/041* (2013.01); *H04L 2007/045* (2013.01)

(56) References Cited

U.S. PATENT DOCUMENTS

| | | |
|---|---|---|
| 2008/0123620 A1 | 5/2008 | Ko et al. |
| 2008/0225818 A1 | 9/2008 | Niu et al. |
| 2009/0204812 A1* | 8/2009 | Baker et al. ................. 713/160 |
| 2009/0222708 A1* | 9/2009 | Yamaga ............. G06F 11/1068 714/773 |
| 2010/0121974 A1 | 5/2010 | Einarsson et al. |
| 2010/0238931 A1* | 9/2010 | Meyer .................... H04L 69/22 370/392 |
| 2011/0164574 A1* | 7/2011 | Rao et al. ..................... 370/329 |
| 2011/0188518 A1 | 8/2011 | Kenney et al. |
| 2012/0063328 A1* | 3/2012 | Kikuchi ........................ 370/244 |

* cited by examiner

FIG.2A

| Header (201) | ... Padding Indication Field 1 bit = 1 (207) ... |
|---|---|
| Payload (203) | Payload |
| Padding Octets: P (205) | All 00h |
| | Padding size Field (1 octet): P (209) |

In case that # of Padding Octets P < 256

FIG.2B

| Header (211) | ... Padding Indication Field 1 bit = 1 (212) ... | |
|---|---|---|
| Payload (213) | Payload | |
| Padding Octets: P (215) | All 00h | P-256 Octets |
| | Secondary Padding size Field (N octets): P-256 (219) | |
| | All 00h | 256 Octets |
| | Primary Padding size Field (1 octet): 0 (217) | |

In case that # of Padding Octets P ≥ 256

| Header (311) | . . . . |
|---|---|
| | Padding Indication Field bit = 1 (307) |
| | . . . . |
| Payload (313) | Payload |

| Padding Octets: P (315) | All 00h | P-255 Octets |
|---|---|---|
| | Secondary Padding size Field (N octets): P-255 (319) | 255 Octets |
| | All 00h | |
| | Primary Padding size Field (1 octet): 255 (317) | |

In case that # of Padding Octets
P ≥ 255

FIG.3

| Header (601) | Payload (603) | Padding Octets: P (605) |
|---|---|---|
| ... Padding Indication Field 2 bits = 1 (609) ... | Payload | All ooh / Padding size Field (1 octet): P (608) |

In case that # of Padding Octets p < 256

FIG. 6A

| Header (611) | Payload (613) | Padding Octets: P (615) |
|---|---|---|
| ... Padding Indication Field 2 bits = 2 (619) ... | Payload | All ooh / Padding size Field (2 octet): P (617) |

In case that # of Padding Octets p ≥ 256

FIG. 6B

METHOD AND APPARATUS FOR TRANSMITTING AND RECEIVING PACKET IN BROADCASTING SYSTEM

CROSS-REFERENCE TO RELATED APPLICATION(S)

This application is a U.S. National Stage application under 35 U.S.C. §371 of an International application filed on Jan. 31, 2013 and assigned application number PCT/KR2013/000811, which claimed the benefit of a Korean patent application filed on Feb. 1, 2012 in the Korean Intellectual Property Office and assigned Serial number 10-2012-0010469, the entire disclosure of which is hereby incorporated by reference.

TECHNICAL FIELD

The present disclosure relates to a method and an apparatus for transmitting and receiving packets in a broadcasting system.

BACKGROUND ART

Current development of broadcasting industries has increased new contents services of various kinds. Such new contents services include not only High Definition (HD) content services, but also Ultra High Definition (UHD) content services, for example. Such high-capacity content services are gradually worsening congestion on networks.

Data is generally transmitted packet by packet, and loss of transmitted data also occurs packet by packet. This means that when a packet is lost on a network, the receiving side cannot identify data inside the lost packet. As a result, users of content services inevitably experience inconveniences of various kinds, including not only degradation of audio quality and degradation of video quality, but also display failure, caption omission, and file loss.

Therefore, a method for restoring data lost on the network is crucial to improvement of the quality of content services. According to a method employed, a source block, which includes a predetermined number of packets, is encoded using a Forward Error Correction (FEC) encoding technique and transmitted. When the FEC encoding technique is used, data transmitted through a network includes a parity block.

The FEC refers to error correction encoding for correcting an error or an erasure symbol, and a FEC frame is a codeword generated through FEC encoding of information to be protected, and includes an information part and a parity (e.g., repair) part. The symbol is a unit of data, and a bit size among bits refers to a symbol size. A packet refers to a transmission unit including a header and a payload, and the payload refers to a unit of user data transmitted from a transmitter positioned inside a packet.

During packet configuration, padding octet information is added after the payload. The last octet (e.g., eight bits) of the padding octet information indicates the number of padded octets. However, the number of padded octets cannot be indicated when padding octets amount to 256 or more. Therefore, there is a request for a method for indicating the number of octets padded after the payload even when padding octets amount to 256 or more.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for indicating the number of octets padded after a payload when, after a payload of a packet, the last octet of the padding octets is 256 or more.

Another aspect of the present disclosure is to provide a method and an apparatus capable of increasing packet transmission efficiency.

In accordance with an aspect of the present disclosure, a method for transmitting a packet in a broadcasting system is provided. The method includes setting a padding indicator field indicating whether padding or not in a header of a packet, allocating a padding size field to a last octet of padding octets after a payload of the packet, determining whether the last octet of the padding octets after the payload of the packet is equal to or larger than a predetermined size, and setting the number of padded octets to be a first number at the last octet of the padding octets to indicate that an additional padding size field exists inside the padding octets when the last octet of the padding octets after the payload of the packet is equal to or larger than the predetermined size.

In accordance with another aspect of the present disclosure, an apparatus for transmitting a packet in a broadcasting system is provided. The apparatus includes a packet generation unit configured to set a padding indicator field indicating whether padding or not in a header of a packet and to allocate a padding size field to a last octet of padding octets after a payload of the packet, and a control unit configured to determine whether the last octet of the padding octets after the payload of the packet is equal to or larger than a predetermined size, and to set the number of padded octets to be a first number at the last octet of the padding octets to indicate that an additional padding size field exists inside the padding octets when the last octet of the padding octets after the payload of the packet is equal to or larger than the predetermined size.

In accordance with another aspect of the present disclosure, a method for receiving a packet in a broadcasting system is provided. The method includes demodulating a signal transmitted from a transmitter and extracting a packet, confirming whether padding or not by using a padding indicator field contained in a header of the packet, confirming whether the number of padded octets at a last octet of padding octets of the packet is a first number when padding is confirmed, and determining that an additional padding size field exists inside the padding octets when the number of padded octets is the first number.

In accordance with another aspect of the present disclosure, an apparatus for receiving a packet in a broadcasting system is provided. The apparatus includes a demodulation unit configured to demodulate a signal transmitted from a transmitter and extract a packet, and a control unit configured to confirm whether padding or not by using a padding indicator field contained in a header of the packet, to confirm whether the number of padded octets at a last octet of padding octets of the packet is a first number when padding is confirmed, and to determine that an additional padding size field exists inside the padding octets when the number of padded octets is the first number.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 2A and 2B illustrate a packet generation method according to a first embodiment of the present disclosure;

FIG. 3 illustrates an example according to the first embodiment of the present disclosure;

FIGS. 6A and 6B illustrate a packet generation method according to a second embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, it is obvious to those skilled in the art that detailed features are presented in the following description solely for the purpose of helping overall understanding of the present disclosure, and the present disclosure can be practiced without them.

And, in describing the present disclosure, a detailed description of known functions and configurations incorporated herein will be omitted as it may make the subject matter of the present disclosure rather unclear.

It is obvious that various embodiments of the present disclosure described below are not limited to a case of transmitting packets using Real-time Transport Protocol (RTP), but are also applicable to cases of Electric Service Guide (ESG) transmission or transmission using an ISO base media file format. It is also obvious that the packet structure according to the present disclosure is also applicable to Moving Picture Experts Group (MPEG) Media Transport (MMT) packets.

Prior to describing various embodiments of the present disclosure, terminology used in the specification will be described below:

A RTP payload refers to data transmitted by means of RTP in one packet and includes, for example, audio samples or compressed video data. It is obvious that a payload format and interpretation of the payload format may exceed the scope of the present specification.

A RTP packet refers to a data packet including a fixed RTP header and payload data.

Figure 1:
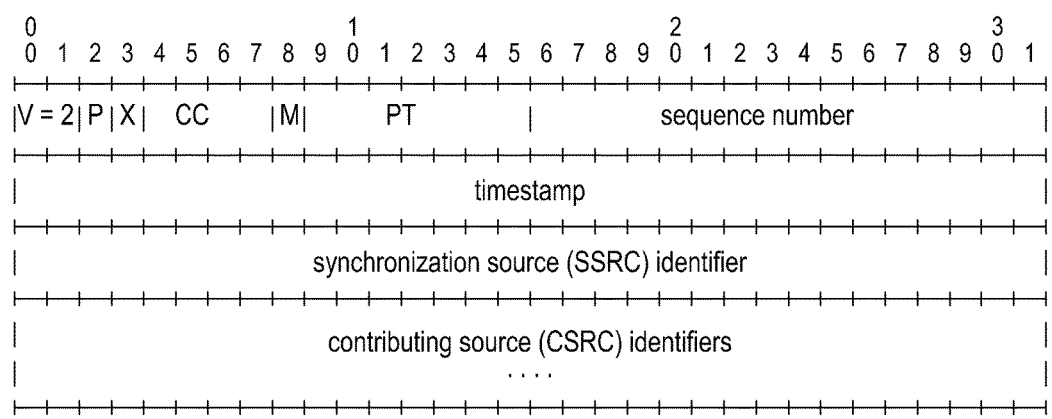
FIG. 1 illustrates a structure of a Real-time Transport Protocol (RTP) fixed header field according to an embodiment of the present disclosure.

RTP data transmission protocol has a RTP fixed header field defined as in FIG. 1.

FIG. 1 illustrates a structure of a RTP fixed header field according to an embodiment of the present disclosure.

Referring to FIG. 1, a padding indicator field of one bit is placed, specifically, to indicate whether there is padding after the RTP payload.

It is meant by one bit of padding (P) that, when padding bits are set, the packet includes one or more additional padding octets at the final end, and not a part of the payload. The last octet of the padding includes the number of padding octets that can be ignored. Padding may be needed to transmit a number of RTP packets in a low-layer protocol data unit, or by a number of encryption algorithms using fixed block sizes.

During packet configuration, padding octet information is added after the payload. In the case of less than 256 octets, the last octet (e.g., eight bits) of the padding octet information indicates the number of padded octets. However, there is a problem in that the number of padded octets cannot be indicated when padding octets amount to 256 or more. Therefore, there is a request for a method for indicating the number of octets padded after the payload.

The reason the device is configured to know the number of padded octets after the payload is as follows. When the transmission device has added padding octet(s) after the payload of a packet, the reception device needs to be able to extract only the actual payload of the packet after removing the octet(s) padded by the transmission device.

The present disclosure proposes a method for generating a packet including a header and a payload in order to address the above-mentioned problems.

FIGS. 2A and 2B illustrate a packet generation method according to a first embodiment of the present disclosure.

According to the first embodiment of the present disclosure, FIG. 2A corresponds to a case in which padding octets amount to less than 256, and FIG. 2B corresponds to a case in which padding octets amount to 256 or more.

In the case of FIG. 2A, a packet is shown that includes a header 201, a payload 203, and padding octets 205. Here, the same application is made as in the case of RTP, and the header 201 of the packet has one bit allocated as a padding indication field 207 to indicate whether padding or not. Padding octets 205 indicates that the size of the padding size field 209 is one octet, which is denoted by P.

In the case of FIG. 2B, a packet is shown that includes a header 211, a payload 213, and padding octets 215. Here the header 211 of the packet has one bit allocated as a padding indication field 212 to indicate whether padding or not. Here, when padding octets amount to 256 or more, the last octet 217 has a specific value (given 0 in FIG. 2B) designated to indicate that a secondary padding size field 219 exists in the padding octets 215. The size of the secondary padding size field 219 is set in connection with the maximum number of padding octets allowed.

In general, the size of a RTP or UDP payload can be expressed by 2 octets and, in this case, N=2. That is, the $256^{th}$ and $255^{th}$ octets from the last octet of padded octets become the secondary padding size field 219 which indicates the number of P−256 padding octets. In the present disclosure, the padding size can be known from the padding size field 209, the primary padding size field 217, and the secondary padding size field 219. It is obvious that knowing the padding size, provided that the size of the entire packets is given, leads to acquisition of the payload size. In addition, since the number of padded octets is immediately known inside the header, the size of the actual payload can be known in advance.

FIG. 3 illustrates another example according to the first embodiment of the present disclosure.

Referring to FIG. 3, a packet is shown that includes a header 311, a payload 313, and padding octets 315. When padding octets amount to 255 or more, the last octet 317 has a specific value (255 in FIG. 3) designated to indicate that a secondary padding size field 319 exists inside the padding octets 315. The $255^{th}$ and $254^{th}$ octets from the last octet of padded octets become the secondary padding size field 319 that indicates the number of P−255 padding octets.

The first embodiment of the present disclosure is advantageous in that, when applied to RTP, compatibility with existing padding methods can be maintained.

As in FIGS. 2A, 2B, and 3, padding octets based on a protocol stack according to the first embodiment of the present disclosure are given in Table 1 below:

TABLE 1

IP Header
UDP/TCP Header
RTP Header
RTP Payload
Padding Octets
IP Header
UDP/TCP Header
RTP Header
RTP Payload
Padding Octets TABLE 1-continued RTP Header
RTP Payload
Padding Octets After a RTP packet is configured as described above, a UDP or TCP header is added in conformity with the port number to be transmitted, an Internet Protocol (IP) header conforming to the IP address to be transmitted is added, and transmission is conducted.

When the RTP packet is to be transmitted using UDP, the sum of the size of the RTP packet, including padded P octets, and the size of UDP header is set in the length field of the UDP header.

When the RTP packet is to be transmitted using TCP, the sum of the size of the RTP packet, including padded P octets, the size of the TCP header, and the size of the IP header is set in the length field of the IP header.

A UDP packet format is given in Table 2 below. Data of Table 2 below is a UDP payload, which becomes a RTP packet including padded P octets.

TABLE 2

| Offset (bits) | 0-15 | 16-31 |
|---|---|---|
| 0 | Source Port Number | Destination Port Number |
| 32 | Length | Checksum |
| 64+ | Data | |

During data transmission, the transmission device uses a protocol, use of which has been prearranged with the reception device, so that the reception device is informed of whether a UDP/IP protocol is used to transmit the RTP packet or a TCP/IP protocol is used to transmit the RTP packet.

Figure 4:
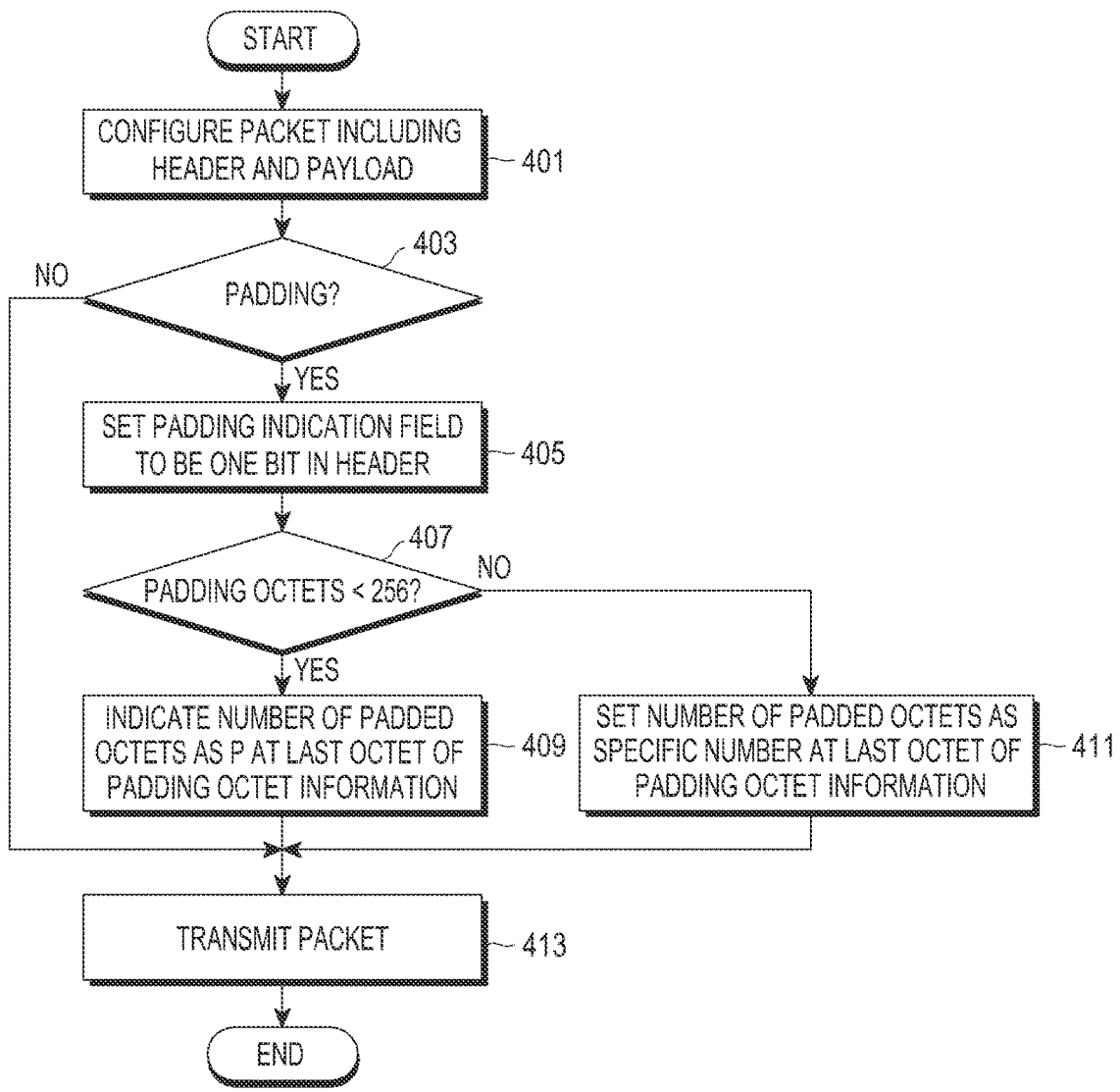
FIG. 4 is a flowchart illustrating a packet generation method by a transmission device according to the first embodiment of the present disclosure.

FIG. 4 is a flowchart illustrating a packet generation method by a transmission device according to a first embodiment of the present disclosure.

In operation 401, the transmission device configures a packet including a header and a payload as illustrated in FIGS. 2A, 2B, and 3.

The transmission device determines in operation 403 whether to pad the packet or not. When determined not to pad, the transmission device proceeds to operation 413 and transmits the packet generated in operation 401 to the reception device. However, when determined to pad, the transmission device sets the padding indicator field of one bit in the header in operation 405. For example, the padding (P) 1 bit of the RTP header is set to be 1.

Thereafter, the transmission device determines in operation 407 whether the padding octets amount to less than 256 or not. When the padding octets amount to less than 256, the transmission device in operation 409 indicates the number of padded octets as P at the last octet of the padding octet information 205, as illustrated in FIG. 2A, clarifies that the size of the padding size field is one octet, and transmits the packet, which has been configured in this manner, to the reception device in operation 413.

On the other hand, when the padding octets amount to 256 or more, the transmission device in operation 411 designates a specific value (0 in FIG. 2B) for the last octet 217 to indicate that a secondary padding size field 219 exists inside the padding octets 215. In this case, the size of the secondary padding size field 219 is set in connection with the maximum number of padding octets allowed. Thereafter, the packet configured in this manner is transmitted to the reception device in operation 413.

Figure 5:
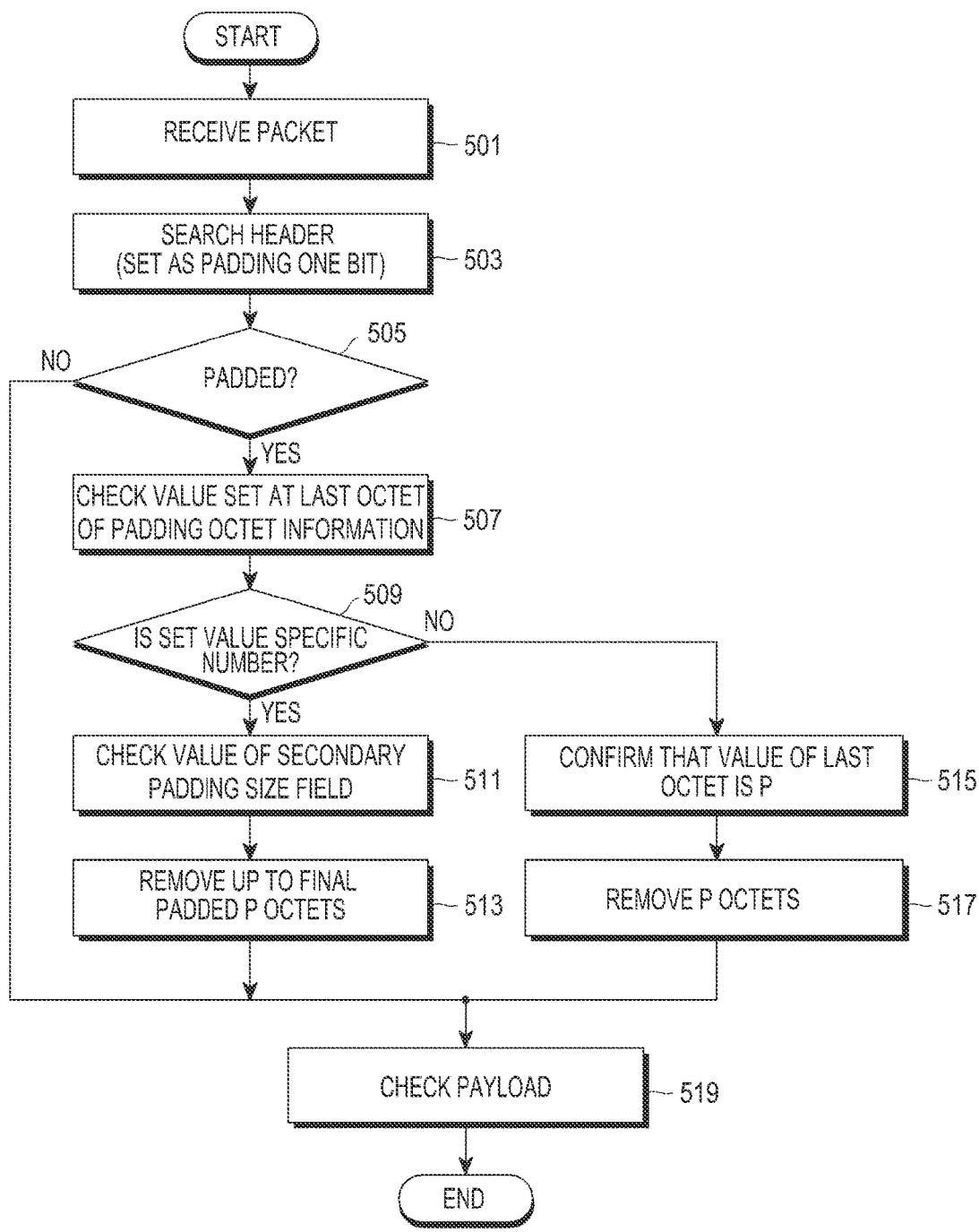
FIG. 5 is a flowchart illustrating a packet reception method by a reception device according to the first embodiment of the present disclosure.

FIG. 5 is a flowchart illustrating a packet reception method by a reception device according to a first embodiment of the present disclosure.

The reception device receives a packet in operation 501 and searches the header of the packet in operation 503. In this case, the reception device checks the IP address from the header of the IP packet and the port number and the like from the UDP or TCP header, thereby receiving a RTP packet it wants to receive. When the RTP packet has been transmitted using UDP/IP, the size of the UDP packet is known by subtracting the size of the IP header from the length field of the IP header, and the size of the RTP packet is confirmed by subtracting the size of the UDP header from the length information of the UDP header.

It is confirmed as a result of the header search that, in the first embodiment of the present disclosure, padding one bit is set in the packet header.

The reception device confirms whether padding or not in operation 505 from the header search result and, in the case of no padding, checks the payload.

On the other hand, in the case of padding, i.e., when padding one bit is set, the reception device checks the value set at the last octet of the padding octet information in operation 507.

The reception device determines in operation 509 whether the value set at the last octet of the padding octet information is a specific number (e.g., zero) or not. When the value set at the last octet of the padding octet information is the specific number, the reception device checks the value of the secondary padding size field in operation 511, checks the value of the secondary padding size field, which includes the $256^{th}$ and $255^{th}$ octets from the rear (set to be P−256), and removes up to the final padded P octets.

However, when the value set at the last octet of the padding octet information is not zero, the reception device confirms in operation 515 that the value of the last octet is P and, since the number of padding octets is P, removes P octets (including the last octet) from the rear.

After the operations 513 and 517, the reception device extracts the actual payload of the packet in operation 519.

When a MMT packet is configured as in the first embodiment of the present disclosure, the MMT header is removed from the MMT packet, from which padding octets have been removed, and the actual MMT payload is transmitted to the upper layer.

The method according to the first embodiment of the present disclosure can be identically applied to MMT, which is under discussion by MPEG. When the method according to the first embodiment of the present disclosure is applied to MMT, the RTP of Table 1 above is replaced with MMT so that the following change is made: RTP header→MMT header, RTP payload→MMT payload. That is, one bit is allocated to the MMT header to indicate whether there is padding that, when padding is necessary, it is set to be one; and, when the number P of padding octets is smaller than 256, the number P of padding octets is indicated at the last octet of the padding octets; when P is 256 or more, P−256 value is set in the secondary padding size field, which includes two octets, i.e. the $256^{th}$ and $255^{th}$ octets from the rear including the last octet, so as to indicate the entire number of padded octets.

FIGS. 6A and 6B illustrate a packet generation method according to a second embodiment of the present disclosure.

In the second embodiment of the present disclosure, FIG. 6A corresponds to a case in which padding octets amount to less than 256, and FIG. 6B corresponds to a case in which padding octets amount to 256 or more.

In the second embodiment of the present disclosure, a plurality of bits are allocated to the padding indication field, and its value is set differently depending on the number of padded octets to indicate octets of the padding size field.

Padding octets based on a protocol stack according to the second embodiment of the present disclosure are given in Table 3 below.

TABLE 3

| IP Header |
| UDP/TCP Header |
| MMT Header |
| MMT Payload |
| Padding Octets |

After configuring the payload, a header is added to determine whether to pad or not when packetizing, and, when padding is necessary, the value of padding (P) two bits of the header is set according to the number P of padding octets.

Referring to FIG. 6A, a packet is shown that includes a header 601, a payload 603, and padding octets 605. Here, the header 601 of the packet has one bit allocated as a padding indication field 609 to indicate whether padding or not. When P is less than 256, as in FIG. 6A, the value of padding (P) two bits is set to be "1" to indicate that the padding size field has a size of one octet; P octets are padded after the payload; and the P value is set at the last octet of the padding octets 608 to indicate that P octets have been padded.

Referring to FIG. 6B, a packet is shown that includes a header 611, a payload 613, and padding octets 615. Here, the header 611 of the packet has one bit allocated as a padding indication field 619 to indicate whether padding or not. When P is 256 or more, as in FIG. 6B, the value of padding (P) two bits is set to be "2" to indicate that the padding size field has a size of two octets; P octets are padded after the payload; and the P value is set at the last two octets of the padding octets 617 to indicate that P octets have been padded.

After a packet is configured as described above, a UDP or TCP header is added in conformity with the port number to be transmitted, an IP header conforming to the IP address to be transmitted is added, and transmission is conducted.

When the packet is to be transmitted using UDP, the sum of the size of the packet, including padded P octets, and the size of UDP header is set in the length field of the UDP header.

When the packet is to be transmitted using TCP, the sum of the size of the packet, including padded P octets, the size of the TCP header, and the size of the IP header is set in the length field of the IP header.

It is obvious that the packet structure of FIGS. 6A and 6B can be applied to a MMT packet.

Figure 7:
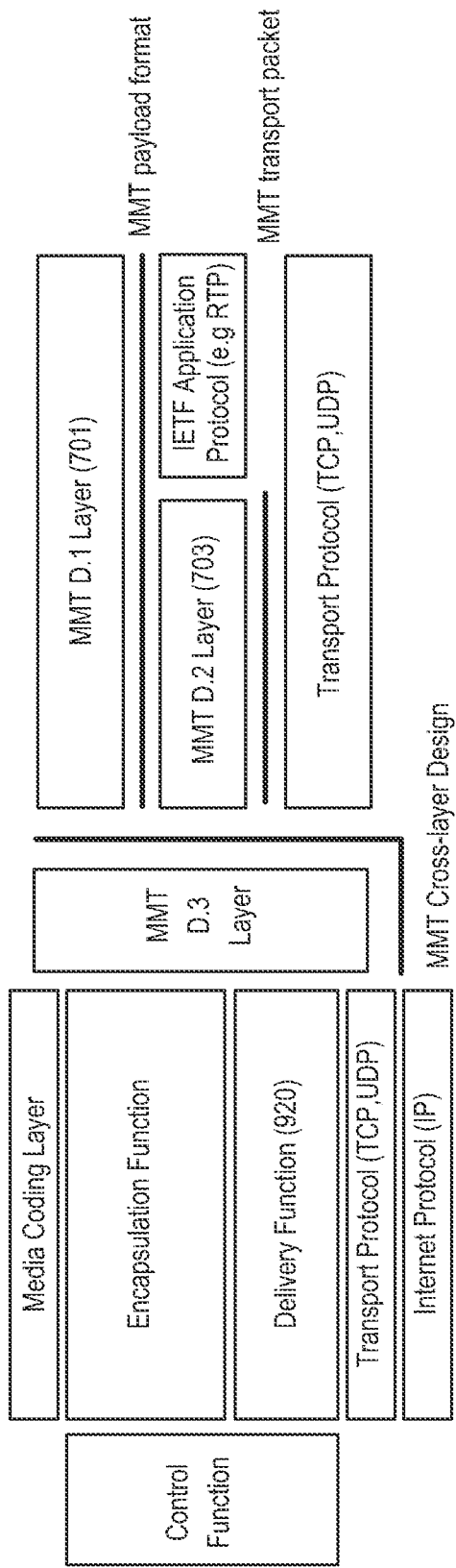
FIG. 7 illustrates a Moving Picture Experts Group (MPEG) Media Transport (MMT) system structure and a detailed delivery function layer according to an embodiment of the present disclosure.

FIG. 7 illustrates a MPEG media transport system structure and a detailed delivery function layer according to an embodiment of the present disclosure.

The left side of FIG. 7 illustrates a MMT system structure, and the right side illustrates a detailed structure of a delivery function.

MMT assets such as compressed audio/video data, widget, txt, subtitle, and file data gather from a media coding layer, undergo an encapsulation function layer (hereinafter, referred to as E layer), become a package (MMT package) in a type similar to a file format, and are outputted; and, on the delivery function layer stage, it turns into a MMT payload format, a MMT transport packet header is added, and it is outputted as a MMT transport packet, or is outputted as a RTP packet using an existing RTP protocol. It then undergoes a transmission protocol layer of UDP/TC and, finally, becomes an IP packet on the IP stage and is transmitted.

On the right side of FIG. 7, the MMT D.2 layer 703 is a layer that generates a MMT transport packet (MMT packet), and the MMT D.1 layer 701 is a layer that generates a MMT payload. The MMT D.2 layer 703 receives a MMT payload format (MMT payload) from the MMT D.1 layer 701 and conducts padding according to a padding indication method according to the present disclosure.

The MMT header format according to the second embodiment of the present disclosure is given in Table 4 below.

TABLE 4

...
Padding(P) field 2 bits
...

The value of padding (P) field 2 bits is defined as follows:
0: no padding
1: the number P of padding octet(s) is smaller than 256, and the last octet of the padding octets indicates P value.
2: the number P of padding octet(s) is 256 or more, and last two octets of the padding octets indicate P value.
3: reserved Although the padding size field is allocated to the last one or two octets of padding octets in the second embodiment of the present disclosure, the present disclosure is not limited thereto and, in the case of a MMT packet, it can also be allocated inside the MMT header. In this case, the size of the MMT header varies depending on the number of padding octets. That is, assuming that the size of the MMT header includes A octets when there is no padding, it is A+1, when the number P of padding octets is smaller than 256, or A+2 when P is 256 or more, the MMT header format in this case being given in Table 5 below:

TABLE 5

...
Padding(P) field
2 bits = 0
...
...
Padding(P) field
2 bits = 1
Padding Size
Field 1
octet (8 bits)
...
...
Padding(P) field
2 bits = 2
Padding Size
Field 2 octets
(16 bits)
...

In addition, although it has been assumed above that the size of the padding size field is one octet when P is smaller than 256, or two octets when P is 256 or more, the present disclosure is not limited thereto and, for example, the size may be one octet when P is 256 or less, or two octets when P exceeds 256 (in this case, the number of actual padding octets=value set at padding size field+1).

Figure 8:
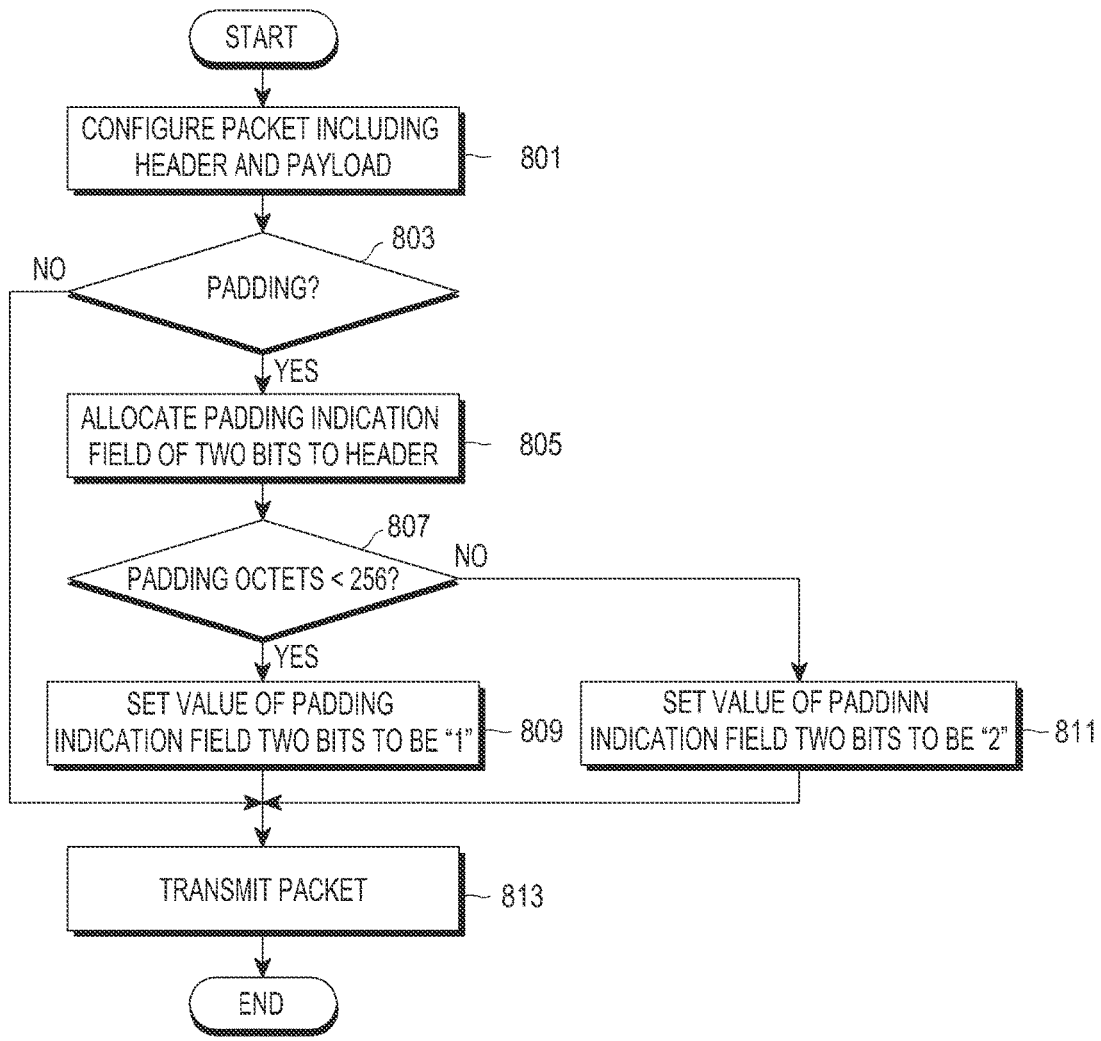
FIG. 8 is a flowchart illustrating a packet generation method by a transmission device according to the second embodiment of the present disclosure.

FIG. 8 is a flowchart illustrating a packet generation method by a transmission device according to a second embodiment of the present disclosure.

The transmission device configures a packet including a header and a payload, as in FIGS. 6A and 6B, in operation 801.

The transmission device determines whether to pad the packet or not in operation 803. When determined not to pad, the transmission device proceeds to operation 813 and transmits the packet, which has been generated in operation 810, to a reception device. On the other hand, when determined to pad, the transmission device allocates a padding indicator field of a plurality of bits to the header in operation 805. For example, the padding (P) 2 bits of the header is set to be 1 or 2.

Thereafter, the transmission device determines in operation 807 whether the padding octets amount is less than 256 or not. When the padding octets amount is less than 256, the transmission device sets the value of padding (P) 2 bits to be "1", as illustrated in FIG. 6A, in operation 809 to indicate that the padding size field has a size of one octet, pads P octets after the payload, and sets P value at the last octet of the padding octets to indicate that P octets have been padded. The transmission device transmits the packet, which has been generated as described above, to the reception device in operation 813.

On the other hand, when the padding octets amount to 256 or more, the transmission device sets the value of padding (P) 2 bits to be "2", as indicated by reference numeral 617 of FIGS. 6A and 6B, in operation 811 to indicate that the padding size field has a size of two octets, pads P octets after the payload, and sets P value at the last two octets of the padding octets to indicate that P octets have been padded. The transmission device transmits the packet, which has been generated as described above, to the reception device in operation 813.

Figure 9:
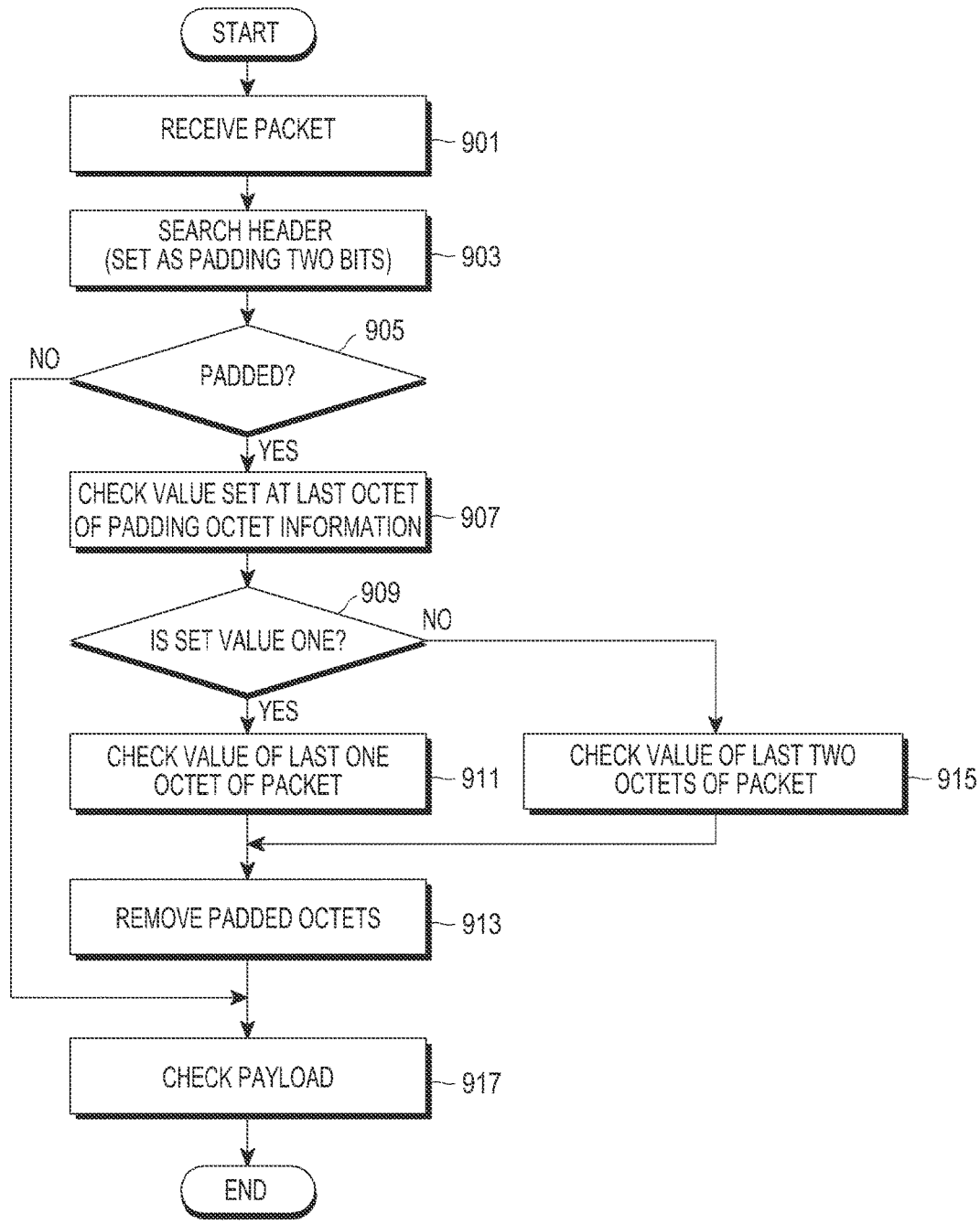
FIG. 9 is a flowchart illustrating a packet reception method by a reception device according to the second embodiment of the present disclosure.

FIG. 9 is a flowchart illustrating a packet reception method by a reception device according to the second embodiment of the present disclosure.

The reception device receives a packet in operation 901 and searches the header of the packet in operation 903. In this case, the reception device checks the IP address from the header of the IP packet and the port number and the like from the UDP or TCP header, thereby receiving a RTP packet it wants to receive. However, when the RTP packet is to be transmitted using UDP/IP, the size of the UDP packet is known by subtracting the size of the IP header from the length field of the IP header, and the size of the RTP packet is confirmed by subtracting the size of the UDP header from the length information of the UDP header.

It is confirmed as a result of the header search that, in the second embodiment of the present disclosure, padding two bits are set in the packet header.

The reception device confirms whether padding or not in operation 905 from the header search result and, in the case of no padding, checks the payload.

On the other hand, in the case of padding, the reception device checks the value set at the last octet of the padding octet information in operation 907.

The reception device determines in operation 909 whether the value set at the last octet of the padding octet information is one or not. When the value set at the last octet of the padding octet information is one, the reception device checks the value of last one octet of the received packet and removes padding octet(s). However, when the value set at the last octet of the padding octet information is zero, the reception device checks the value of the last two octets of the received packet and removes padding octets. Thereafter, the reception device can extract only the actual payload of the packet.

When a MMT packet is configured as in the second embodiment of the present disclosure, the MMT header is removed from the MMT packet, from which padding octets have been removed, and the actual MMT payload is transmitted to the upper layer.

Figure 10:
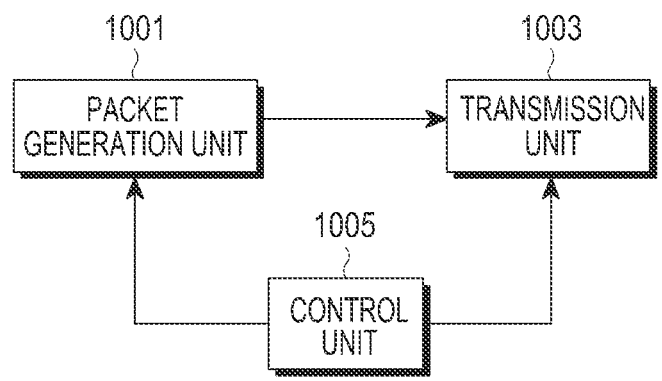
FIG. 10 is a block configuration diagram of a transmission device according to an embodiment of the present disclosure.

FIG. 10 is a block configuration diagram of a transmission device according to an embodiment of the present disclosure.

The transmission device includes a packet generation unit 1001, a transmission unit 1003, and a control unit 1005.

The packet generation unit 1001 is configured to generate packets according to packet generation methods according to the first and second embodiments of the present disclosure. The methods have already been described in detail, and repeated descriptions will be omitted herein.

The transmission unit 1003 is configured to transmit packets, which have been generated by the packet generation unit 1001, to a reception device.

The control unit 1005 is configured to control operations of the packet generation unit 1001 and the transmission unit 1003.

Figure 11:
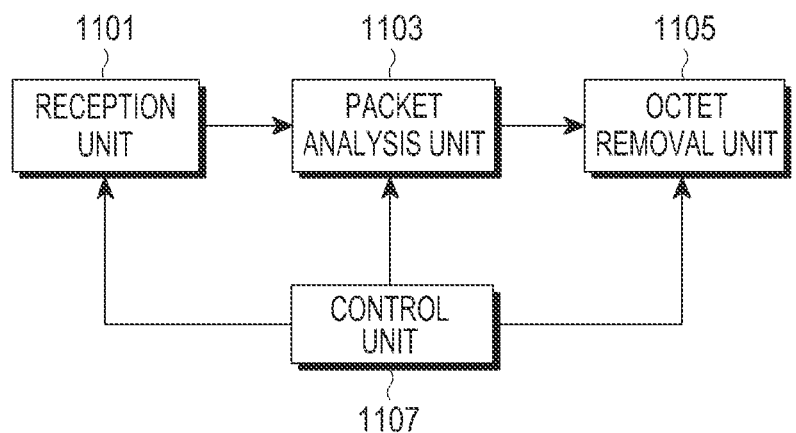
FIG. 11 is a block configuration diagram of a reception device according to an embodiment of the present disclosure.

FIG. 11 is a block configuration diagram of a reception device according to an embodiment of the present disclosure.

The reception device includes a reception unit 1101, a packet analysis unit 1103, and a control unit 1107.

The reception unit 1101 is configured to receive packets from the transmission device.

The packet analysis unit 1103 is configured to analyze packets generated according to the first and second embodiments of the present disclosure. The packet analysis methods have already been described in detail, and repeated descriptions will be omitted herein.

The control unit 1107 is configured to control operations of the reception unit 1101 and the packet analysis unit 1103.

The packet generation method by a transmission device and the packet reception method by a reception device, including the first and second embodiments described above, can be applied to all technical fields of convergence environments when the service provider configures a service using a plurality of contents and transmits it using one or a plurality of paths on a heterogeneous network.

The padding indication method according to the first embodiment of the present disclosure described above does not place a padding size field in the header, but uses padding octets to conduct allocation, thereby increasing transmission efficiency; and the padding indication method according to the first embodiment of the present disclosure does not place any limit on the number of padding octets while maintaining compatibility with existing disclosures, so that it can conduct as much padding as necessary.

In addition, the padding indication method according to the second embodiment of the present disclosure described above variably allocates the padding size field according to the number P of padding octets, thereby increasing efficiency of the header, and the fact that the number of padded octets is immediately known inside the header makes it possible to know the size of actual payload in advance, enabling fast transmission.

The present disclosure does not place the padding size field in the header, but uses padding octets to conduct allocation, thereby increasing transmission efficiency.

The present disclosure does not place any limit on the number of padding octets while maintaining compatibility with existing disclosures, so that it can conduct as much padding as necessary.

The present disclosure variably allocates the padding size field according to the number P of padding octets, thereby increasing efficiency of the header.

The present disclosure can immediately know the number of padded octets inside the header, making it possible to know the size of actual payload in advance and thereby conduct fast transmission.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for transmitting a packet in a broadcasting system, the method comprising:
   generating a packet including a payload, a header and a padding that is appended to the payload;
   adding padding information to the packet;
   transmitting the packet and the padding information,
   wherein the padding information includes a first padding size field indicating whether a size of the padding is larger than a predetermined size,
   wherein the padding information includes a second padding size field indicating a size difference between the size of the padding and the predetermined size if the first padding size field indicates that the size of the padding is larger than the predetermined size,
   wherein the size of padding includes a size of the first padding size field and a size of the second padding size field, and
   wherein the first padding size field is located at the end of the padding while the second padding size field is located inside the padding.

2. The method as claimed in claim 1, wherein, if the first padding size field indicates that the size of the padding is equal to or less than the predetermined size, the second padding size field doesn't exist.

3. The method as claimed in claim 2, wherein the predetermined size is 255 bits.

4. An apparatus for transmitting a packet in a broadcasting system, the apparatus comprising:
   at least one processor configured to:
      generate a packet including a payload, a header and a padding that is appended to the payload; and
      add padding information to the packet; and
   a transmitter configured to transmit the packet and the padding information,
   wherein the padding information includes a first padding size field indicating whether a size of the padding is larger than a predetermined size,
   wherein the padding information includes a second padding size field indicating a difference between the size of the padding and the predetermined size if the first padding size field indicates that the size of the padding is larger than the predetermined size,
   wherein the size of padding includes a size of the first padding size field and a size of the second padding size field, and
   wherein the first padding size field is located at the end of the padding while the second padding size field is located inside the padding.

5. The apparatus as claimed in claim 4, wherein
   if the first padding size field indicates that the size of the padding is equal to or less than the predetermined size, the second padding size field doesn't exist.

6. The apparatus as claimed in claim 5, wherein the predetermined size is 255 bits.

7. A method for receiving a packet in a broadcasting system, the method comprising:
- receiving a packet including a payload, a header, and a padding that is appended to the payload;
- wherein padding information is added to the packet,
- wherein the padding information includes a first padding size field indicating whether a size of the padding is larger than a predetermined size, and
- wherein the padding information includes a second padding size field indicating a difference between the size of the padding and the predetermined size if the first padding size field indicates that the size of the padding is larger than the predetermined size,
- wherein the size of padding includes a size of the first padding size field and a size of the second padding size field, and
- wherein the first padding size field is located at the end of the padding while the second padding size field is located inside the padding.

8. The method as claimed in claim 7, wherein
if the first padding size field indicates that the size of the padding is equal to or less than the predetermined size, the second padding size field doesn't exist.

9. The method as claimed in claim 7, wherein the predetermined size is 255 bits.

10. An apparatus for receiving a packet in a broadcasting system, the apparatus comprising:
- at least one processor configured to control a receiver for receiving a packet including a payload, a header and a padding that is appended to the payload,
- wherein padding information is added to the packet,
- wherein the padding information includes a first padding size field indicating whether a size of the padding is larger than a predetermined size, and
- wherein the padding information includes a second padding size field indicating a difference between the size of the padding information and the predetermined size if the first padding size field indicates that the size of the padding is larger than the predetermined size,
- wherein the size of padding includes a size of the first padding size field and a size of the second padding size field, and
- wherein the first padding size field is located at the end of the padding while the second padding size field is located inside the padding.

11. The apparatus as claimed in claim 10, wherein
if the first padding size field indicates that the size of the padding is equal to or less than the predetermined size, the second padding size field doesn't exist.

12. The apparatus as claimed in claim 11, wherein the predetermined size is 255 bits.

\* \* \* \* \*